(12) United States Patent
McIntosh (10) Patent No.: US 10,046,982 B2
(45) Date of Patent: Aug. 14, 2018

(54) WATER RECLAMATION AND REUSE SYSTEM

(71) Applicant: Todd McIntosh, Laguna Niguel, CA (US)

(72) Inventor: Todd McIntosh, Laguna Niguel, CA (US)

( * ) Notice: Subject to any disclaimer, the term of this patent is extended or adjusted under 35 U.S.C. 154(b) by 8 days.

(21) Appl. No.: 14/839,429

(22) Filed: Aug. 28, 2015

(65) Prior Publication Data
US 2016/0339368 A1    Nov. 24, 2016

Related U.S. Application Data

(60) Provisional application No. 62/162,957, filed on May 18, 2015.

(51) Int. Cl.
*C02F 1/00*   (2006.01)
*C02F 1/50*   (2006.01)
*C02F 103/00* (2006.01)

(52) U.S. Cl.
CPC .............. *C02F 1/004* (2013.01); *C02F 1/008* (2013.01); *C02F 1/50* (2013.01); *C02F 2103/002* (2013.01); *C02F 2201/005* (2013.01); *C02F 2209/40* (2013.01); *C02F 2209/42* (2013.01)

(58) Field of Classification Search
None
See application file for complete search history.

(56) References Cited

U.S. PATENT DOCUMENTS

5,106,493 A    4/1992   McIntosh

*Primary Examiner* — Robert James Popovics
(74) *Attorney, Agent, or Firm* — Marcus C. Dawes (57) ABSTRACT

An improved gray water reclamation system. A filter-valve is coupled to a gray water conduit between a drain where gray water enters the system and a gray water tank and/or sump. Water which enters the filter-valve contacts a filter screen which separates the incoming water into a portion of screened water and a portion of particulate matter which remains behind in the main portion of the filter-valve. The portion of screened water continues out of the filter-valve and into the gray water tank. The filter-valve is cleaned or maintained by backwashing the collected contaminates and particulate matter through the normal sewer drain system by opening an installed motor operated valve and allowing the collected particulate matter and backwash to pass there through via the waste conduit. The backwash and particulate matter from the filter-valve is then directed into a second waste conduit which is coupled to a pre-existing drainage system.

14 Claims, 7 Drawing Sheets

Fig. 1.

PRIOR ART

Fig. 2.

PRIOR ART

_Fig. 3._

_Fig. 5._

PRIOR ART

Fig. 4.

PRIOR ART

WATER RECLAMATION AND REUSE SYSTEM

BACKGROUND

Field of the Technology

This invention relates generally to the field of water conservation systems and, more particularly, to systems for recycling waste water, referred to generally as "gray-water."

Description of the Prior Art

Chronic, and often severe, water shortages exist in many parts of the United States and elsewhere in the world. Such water shortages, for example in the Southwestern United States, are growing more acute from year to year as a result of natural population increase and the southwestern shift of population from Eastern and Northern States. The State of California has, as an illustration, presently suffered several years of unusually low rainfall and drought conditions are threatening agriculture, industry, businesses and homeowners. Cities such as Santa Barbara and Los Angeles have mandated water conservation practices and slow- or no-growth policies have been instituted in places because of the unavailability of water for new residences.

Although these water shortage problems may be ameliorated—in the short term—by several years of good rainfall, the long term prognosis is unfavorable considering the increases in population and the ever-increasing need for water. As a result, good water conservation practices are needed if water-scarce regions of the world are to prosper or even survive.

Some heavy water using industries have developed elaborate and expensive treatment facilities for reclaiming used water and reusing the water for industrial purposes. However, such facilities are extremely costly and have, therefore, generally been limited to large industries which can afford the cost, and especially those industries in which the cost of using reclaimed water is less than the cost of water supplied by local water districts or municipalities.

Few serious attempts have, however, been made by homeowners to reclaim gray-water and use if for lawns and the like. What attempts that have been made have usually involved using buckets to collect wash water and emptying the buckets on shrubs and flowers to keep them alive. Ordinarily, to the present inventor's knowledge, has there been any practical system for recycling the relatively large amounts of water used for showering and bathing and for washing clothes. Some problems associated with make-shift methods for reusing gray-water are health problems, and it is possible that in some areas the use of untreated wash water may be in violation of city ordinances or health codes. Moreover, untreated waste water with detergents and soaps may be detrimental to plants and shrubs. In any event, the physical problems of handling buckets of wash water can be expected to limit any serious use of such methods and the amount of fresh water saved by such methods is considered to be minimal considering the amount of fresh water that is used.

What is needed is a system for automatically collecting gray-water and making it available in preexisting small commercial and residential systems without any physical handling of the water by individuals needed and such that the amount of fresh water saved by the water reuse system is substantial and continual and the costs associated with the water reuse system—including installation cost and maintenance—is at least offset by reduced water bills. What is further needed is a waste water system which is universal in nature and may be adapted to accept water from all sources with the exception of toilets and garbage disposals.

It is the principal purpose of the present invention to provide such a system for reusing gray-water in a safe, economical and trouble-free manner, and for providing a system which works in a continual manner with minimal attention required. Such a system of the present invention is particularly suited for homes, apartments, hotels, motels, office buildings, small businesses. schools, and the like.

BRIEF SUMMARY

The present invention includes a gray-water reclamation and reuse system for collecting, filtering and storing for use waste water. The system includes a gray water tank for collecting waste water, a filter-valve located between the gray water tank and a gray water source, and a filter indirectly coupled to the gray water tank. A holding tank is further indirectly connected to the filter and a first pump disposed between the gray water tank and the filter is configured to pump gray water from the gray water tank, through the filter, and into the holding tank. A second pump is disposed between the holding tank and an outlet which then pumps filtered gray water from the holding tank to the outlet. Finally the system includes a control means for controlling the operation of the first and second pumps, the filter, and the filter-valve.

In one embodiment, the filter-valve within the system includes a filter screen asymmetrically disposed within an internal volume of the filter-valve.

In another embodiment the filter-valve is coupled to an outlet conduit connected to the gray water source, a gray water tank conduit which is connected to the gray water tank, and a waste conduit which connected to the filter. The filter-valve in this embodiment includes a filter screen that is disposed only over the gray water tank conduit coupled to the filter-valve.

In another embodiment, the filter-valve includes a motor operated valve which controls the access to at least one of the conduits connected to the filter-valve. Preferably, the motor operated valve is disposed on a waste conduit which is connected to the filter-valve.

In a separate embodiment, the system further includes a drain suction unit disposed inside of a gray water source, wherein the drain suction unit is indirectly coupled to the system downstream of the gray water tank. In this embodiment, the drain suction unit comprises a plurality of inlets and a hose aperture. The first pump is also further configured to draw in gray water through the drain suction unit through the inlets.

The invention further includes a gray-water reclamation and reuse system for collecting, filtering and storing for use waste water. The system includes a gray water tank for collecting waste water, a plurality of filter-valves disposed between the gray water tank and a corresponding plurality of gray water sources, and a filter indirectly coupled to the gray water tank. A holding tank is further provided which is indirectly coupled to the filter and a first pump is disposed between the gray water tank and the filter to pump gray water from the gray water tank, through the filter, and into the holding tank. A second pump disposed between the holding tank and an outlet then pumps filtered gray water from the holding tank to the outlet. Finally, a control means is present to control the operation of the first and second pumps, the filter, and the plurality of filter-valves.

In one embodiment, each of the plurality of filter-valves within the system are coupled to an outlet conduit which is in turn connected to its corresponding gray water source, a gray water tank conduit which is connected to the gray water tank, and a waste conduit connected to the filter. Each of the plurality of filter-valves may also include a filter screen disposed only over the gray water tank conduit coupled to each filter-valve. Additionally, each of the filter-valves may include a motor operated valve disposed on the waste conduit coupled to each of the plurality of filter-valves.

In another embodiment, the system also has a number of drain suction units disposed inside of a like number of gray water sources. Each of the drain suction units are indirectly coupled to the system downstream of the gray water tank.

The current invention further provides for a method for reclaiming and reusing waste water. The method includes directing gray water from a gray water source into a filter-valve, separating the gray water into a portion of screened water and particulate matter by forcing the gray water though a filter screen disposed within the filter-valve, and collecting the screened water into a gray water tank. The screened water is then filtered by pumping the screened water through a filter which is then stored in a holding tank. Finally, the filtered water is directed from the holding tank to a fresh water pipe.

In one embodiment, the method step of forcing the gray water through the filter screen disposed within the filter-valve includes maintaining a motor operated valve disposed between the filter-valve and a waste conduit coupled to the filter-valve in a closed position, directing the gray water into the filter-valve through an outlet conduit coupled to the filter-valve, and then directing the gray water through the filter screen disposed only over a gray water tank conduit coupled to the filter-valve. After the filter screen separates the gray water into a portion of screened water and a portion of particulate matter, the portion of screened water is directed to the gray water tank through the gray water tank conduit connected to the filter-valve.

In a related embodiment backwashing the filter-valve may be accomplished by opening the motor operated valve disposed between the filter-valve and the waste conduit coupled to the filter-valve, directing the portion of particulate matter out of the filter-valve through the waste conduit, and then removing the portion of particulate matter from the reclamation system. At that point, the motor operated valve disposed between the filter-valve and the waste conduit coupled to the filter-valve may be closed.

In another embodiment, the method also includes suctioning gray water from a gray water source through a drain suction unit. The suctioned gray water is then directed into a conduit downstream of the gray water tank and then pumped into the filter.

In a related embodiment, the method step of suctioning gray water from the gray water source through a drain suction unit specifically involves drawing the suctioned gray water through a stationary fixture adjacently disposed to the gray water source and into a slab conduit coupled to a conduit disposed downstream of the gray water tank.

While the apparatus and method has or will be described for the sake of grammatical fluidity with functional explanations, it is to be expressly understood that the claims, unless expressly formulated under 35 USC 112, are not to be construed as necessarily limited in any way by the construction of "means" or "steps" limitations, but are to be accorded the full scope of the meaning and equivalents of the definition provided by the claims under the judicial doctrine of equivalents, and in the case where the claims are expressly formulated under 35 USC 112 are to be accorded full statutory equivalents under 35 USC 112. The disclosure can be better visualized by turning now to the following drawings wherein like elements are referenced by like numerals.

The disclosure and its various embodiments can now be better understood by turning to the following detailed description of the preferred embodiments which are presented as illustrated examples of the embodiments defined in the claims. It is expressly understood that the embodiments as defined by the claims may be broader than the illustrated embodiments described below.

DETAILED DESCRIPTION OF THE PREFERRED EMBODIMENTS

Figure 1:
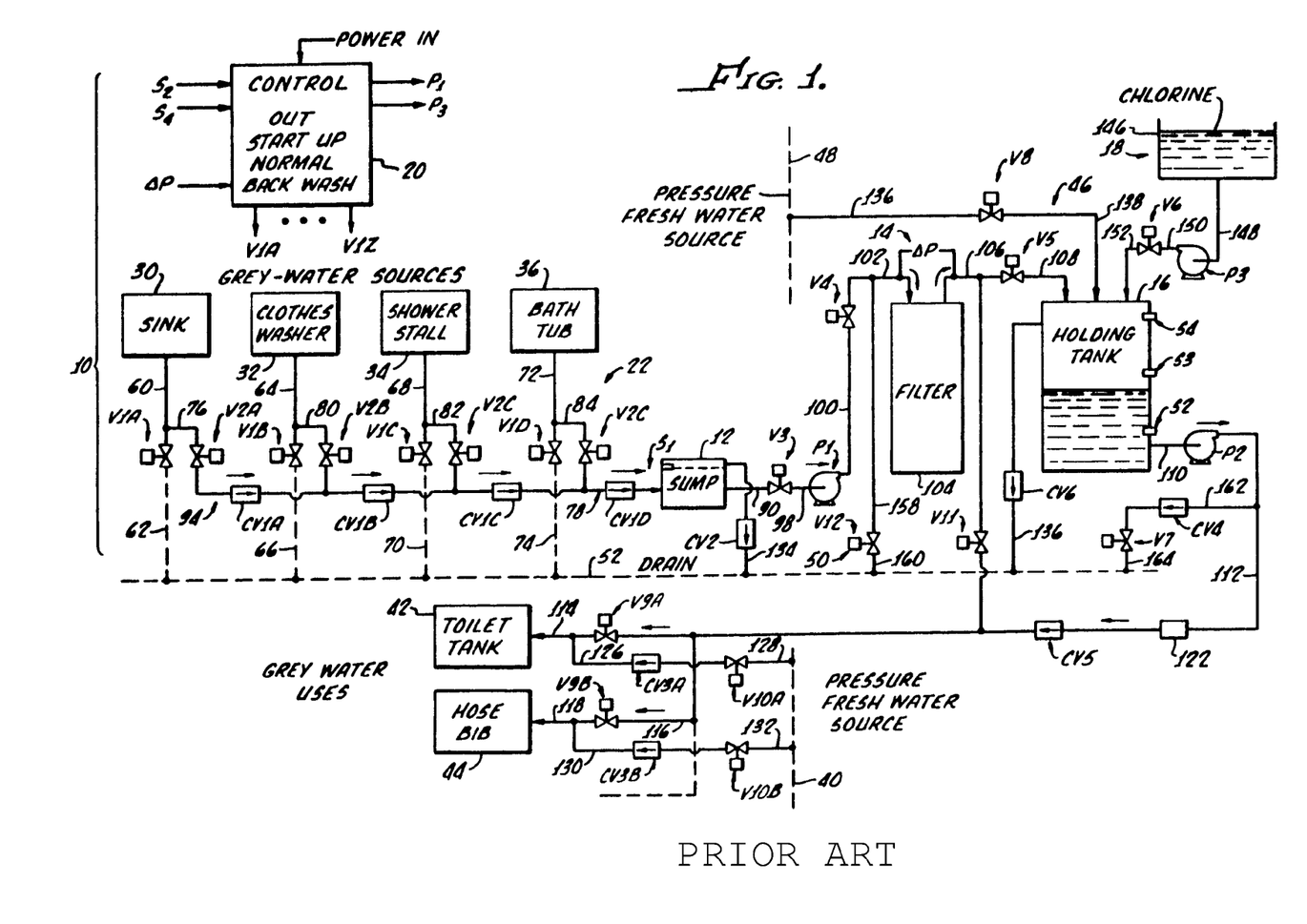
FIG. 1 is a schematic drawing of the gray-water reclamation and reuse system according to the present invention, showing a gray-water sump, filter, holding tank, and chlorinating means, showing associated plumbing, valves, pumps and controls therefor, gray-water flow arrows showing the system in its normal operation configuration.

Shown in FIG. 1, in accordance with the present invention, is a gray-water reclamation and reuse system 10 for reclaiming and reusing dirty water from such sources as shower stalls, bathtubs, sinks, clothes washers and other sources from which used—but not seriously contaminated—water is ordinarily discharged into a drain pipe leading to a sewer, septic tank, or the like. As used herein, the term "gray-water, is to be understood to mean waste water that may contain some dirt and usually soap or detergents but is not heavily contaminated water. System 10 of the present invention would, for example, not be used to reclaim and reuse water from toilets. Nor would system 10 ordinarily be used to reclaim and reuse water from automatic dishwashers since much of such water (except for rinse cycles) would usually be too contaminated with food particles and grease for satisfactory reuse—at least without excessive filtering and chemical treatment being needed. System 10 could, however, readily be adapted for reclaiming and reusing just rinse-cycle waste water from automatic dishwashers.

As shown in FIG. 1, and as more particularly described below, gray-water reclamation and reuse system 10 comprises generally a waste water sump 12, waste water filtering means 14, a filtered waste water holding tank 16, waste water chlorinating means 18, and control means 20. Connecting means, generally identified by reference number 22, are provided for supplying waste water to sump 12 from drain sources such a sink 30, a clothes washer 32, a shower stall 34, and a bathtub 36. In this regard, it is to be appreciated that the above-listed sources of waste water are given by way of example with no limitation being thereby intended or implied. In some instances only a single source of waste water may exist and in other cases there may be more sources, for example, from a number of sinks 30 or several shower stalls 34. Filtered waste water delivery means 40 are included for delivering filtered waste water, under pressure, from holding tank 16 to such using points as a toilet tank 42 and a hose connection or hose bib 44. Again, it is to be appreciated that the above-listed use points are given merely by way of example and no limitations are thereby intended or implied. Additional use points, such as a lawn sprinkler system, may be included and system 10 may supply filtered and treated gray-water to several toilets and/or hose bibs.

Further included in gray-water reclamation and reuse system 10 are fresh water make-up means 46 for adding fresh water (that is, non-waste water) from an existing fresh water pressure pipe or conduit 48 to holding tank 16 in the event that more water is required from the tank than can be provided by waste water from connecting means 22. In addition, system 10 includes filter back washing means 50 for the periodic back flushing of filtering means 14 into a preexisting drain pipe or conduit 52. As described below, a number of electrically-controlled (that is, solenoid-operated) valves, one-way flow (check) valves, sensors, pumps and conduits are included in system 10.

More particularly described, connecting means 22 for providing waste water from sink 30, clothes washer 32, shower stall 34 and bathtub 36 (and the like) to sump 12 comprise a normally open (N.O.) drain valve V1A which is connected between a water pipe or conduit 60 to the drain of sink 30 and a conduit or pipe 62 to preexisting drain pipe 52. In a similar manner, a N.O. valve V1B is connected between conduits 64 and 66 which connect the drain of clothes washer 32 to drain pipe 52; a N.O. valve V1C is connected between conduits 68 and 70 which connect the drain of shower stall 34 to the drain pipe; and a N.O. valve V1D is connected between conduits 72 and 74 which connect the drain of bathtub 36 to the drain pipe.

Connected in parallel with valves V1A-V1D are corresponding normally closed (N.C.) valves V2A-V2D. Valve V2A is connected between a conduit or pipe 76, which tees into conduit 60 from sink 30, and a common conduit or pipe 78 which discharges into sump 12. Similarly, valve V2B is connected between a conduit 80, which tees into conduit 64 from washer 32, and common conduit 78; valve V2C is connected between conduit 82, which tees into conduit 68 from shower stall 34, and conduit 78; and valve V2D is connected between a conduit 84, which tees into conduit 72 from bathtub 36, to common conduit 78. Preferably, one-way (check) valves CV1A, CV1B, CV1C and CV1D are connected in series in conduit 78 downstream of valves V2A, V2B, V2C and V2D, respectively, to prevent any backflow of waste water into any of sink 32, washer 32, shower stall 34 and bathtub 36 in the event any of such valves fail to operate in the intended manner.

When valves V1A-V1D and open and valves V2A-V2D are closed, waste water is permitted to drain in a normal manner from sink 30, washer 32, shower stall 34 and bathtub 36 (as well as any other similarly connected sources of reusable wash water) into existing drain pipe 52. On the other hand, when valves V1A-V1D are closed and valves V2A-V2D are open waste water from sink 30, washer 32, shower stall 34 and bathtub 36 (as well as any other similarly connected sources of reusable waste water) drains into sump 12 (through check valves CV1A-CV1D) for reuse. Valves V1A-V1D and V2A-V2D can, collectively, be considered to comprise a waste water diverting means 94.

Although for ease in describing and understanding system 10, each pair of valves V1A, V2A-V1D, V2D is shown and described herein as comprising two separate valves, it is to be understood that a single three-way valve can be used in place of each such pair of valves and the use of such three-way valves is, in fact, the preferred implementation. Other paired valves wherein one valve of the pair is open when the other valve of the pair is closed can likewise be implemented by a single three-way valve.

A N.C. valve V3 is connected between a conduit or pipe 96 from the outlet of sump 12 and a conduit 98 to a first water pump P1. In turn, a N.O. valve V4 is connected between a conduit 100 from the outlet of pump P1 to a conduit or pipe 102 connected to the inlet of a filter 104 which comprises the major part of filtering means 14.

Connected between a conduit or pipe 106 from the outlet of filter 104 and a conduit or pipe 108 connected to a top of holding tank 16 is a N.O. valve V5. First pump P1 is operative for pumping waste water from sump 12 to and through filter 104 and into holding tank 16 (and through valves V3, V4, and V5) for reuse.

A conduit or pipe 110 is connected between a bottom outlet of holding tank 16 and the inlet of a second pump P2. Connected to the outlet of second pump P2 is a common conduit 112 which leads to a N.C. valve V9A, which is, in turn, connected to a conduit or pipe 114 which leads to the inlet of the water tank of toilet 42. A N.C. valve V9B is connected between a conduit to pipe 116, which is teed into conduit 112 upstream of valve V9A, and a conduit 118 leading to hose bib 44. A check valve CV5 is connected in conduit 112, upstream of valves V9A and V9B, to prevent and back flow of water into holding tank 16. Second pump P2 is thus operative for pumping filtered waste water from holding tank to toilet tank 42, hose bib 44, and other users of the filtered waste water, such a lawn sprinkler system (and through valves V9A and V9B and check valve CV5). The operation of second pump P2 is controlled, as more particularly described below, by a pressure sensor 122 installed in conduit 112 downstream of the pump.

Connected in parallel with valves V9A and V9B are N.O., anti-siphon valves V10A and V10B, respectively. Valve V10A is connected between a conduit or pipe 126, which is teed into conduit 114, and a conduit or pipe 128 which is connected to an existing fresh water pipe 48. Similarly, valve V10B is connected between a conduit or pipe 130, which is teed into conduit 18, and a conduit 132 connected to fresh water conduit 48. Check valves CV3A and CV3B connected in respective conduits 126 and 130 assure, in conjunction with anti-siphon valves V10A and V10B, that no back flow of any filtered waste water into water pipe 48 occurs.

It is apparent that with an adequate supply of filtered waste water in holding tank 16 and with valves V10A and V10B closed and valves V9A and V9B open, filtered waste water is delivered, under pressure, by second pump P2 from the holding tank to toilet tank 42 and hose bib 44 (and to other similarly connected points of filtered and treated gray-water reuse). On the other hand, for example, when system 10 is out of service, with valves V10A and V10B open and valves V9A and V9B closed, pressurized fresh water is provided from water pipe 48 to toilet tank 42 and hose bib 44.

An overflow conduit 134 is connected from upper regions of sump 12 to drain conduit 52 and an overflow conduit 136 is connected from upper regions of holding tank 16 to the drain conduit. Check valves CV2 and CV6 in respective overflow conduits 134 and 136 prevent any back flow of water from drain conduit 52 into sump 12 and holding tank 16.

A N.C., anti-siphon valve V8 is connected between a conduit 138, which is connected to pressurized fresh water conduit 48, and a conduit 138, which is connected to a top inlet of holding tank 138. Operation of valve V8 causes fresh water to be fed from conduit 48 into tank 16 in the event there is insufficient filtered waste water in the tank to meet reuse demands. In this manner, the supply of filtered waste water is augmented by fresh water.

Although filtered waste water from holding tank 16 is not intended to be used as potable water, it is still desirable to chlorinate the filtered waste water before its use so reduce odors and to kill germs because individuals and domestic animals may come into contact with such water. Moreover, some local ordinances or codes may require that waste water intended for reuse be treated to kill germs and bacteria. To this end, a source of chlorine or chlorine precursor is provided in a small tank 146. A third pump P3 is connected between a conduit or pipe 148, which is connected to a lower outlet of tank 146, and a conduit or pipe 150, which is, in turn connected to a N.C. valve V6. The outlet of valve V6 is connected to a conduit or pipe 152 which is connected to a top inlet of holding tank 16. Third pump P3 functions to pump material from tank 146 into holding tank 16 to chlorinate filtered waste water therein.

Figure 2:
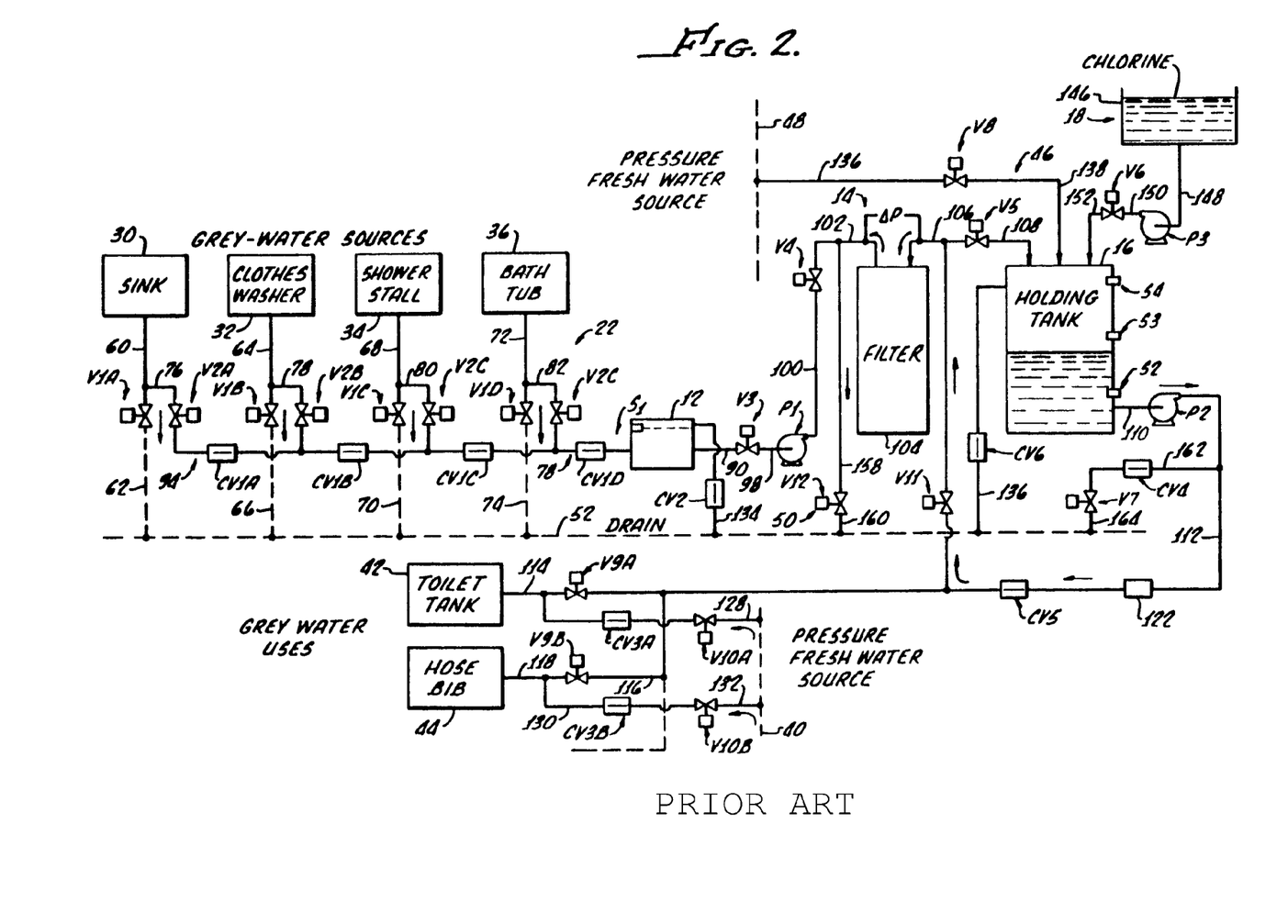
FIG. 2 is a schematic drawing of the gray-water reclamation and reuse system of FIG. 1, gray-water flow arrows indicating a mode of system operation for back washing of the filter.

Back washing (back flushing) of filter 104 is enabled by N.C. valves V11 and V-12 (as depicted in FIG. 2). Valve V11 is connected between a conduit 154, which is teed into conduit 112 (from second pump P2) and a conduit 156 which is teed into conduit 106 from filter 104. Valve V12 is connected between a conduit 158 which is teed into conduit 102 feeding into filter 104 and a conduit 160 which is teed into drain pipe 52. With valves V11 and V12 open and other valves (including valves V4, V5 and V9A and V9B) closed, second pump P2 pumps filtered waste water from holding tank 16 through filter 104 in the reverse direction and into drain pipe 52.

The pumping of filtered waste water from holding tank 16 into drain pipe 52 is enabled by a N.C. valve V7 which is connected between a conduit or pipe 162, which is teed into conduit 112 (downstream of second pump P2) and a conduit or pipe 164 which is teed into drain pipe 52. With valve V7 open and valves V9A and V9B closed, pump P2 can be operated to pump filtered waste water from holding tank 16 directly into drain pipe 52, as may be desired to empty such tank for servicing.

Level sensor S1-S4 are provided for sensing the level of waste water in sump 12 and holding tank 16 and for providing electrical signals to control means 20. As such, sensor S1 is connected to sump 12 for sensing an upper water level and sensors S2, S3, and S4 are connected to holding tank 16 to respectively sense low, intermediate and high water levels in the tank and to provide electric signals to control means 20. Preferably, to determine when back washing of filter 104 is needed, a pressure drop (delta P) is measured across the filter and an electric signal relating thereto is provided to control means 20.

Figure 3:
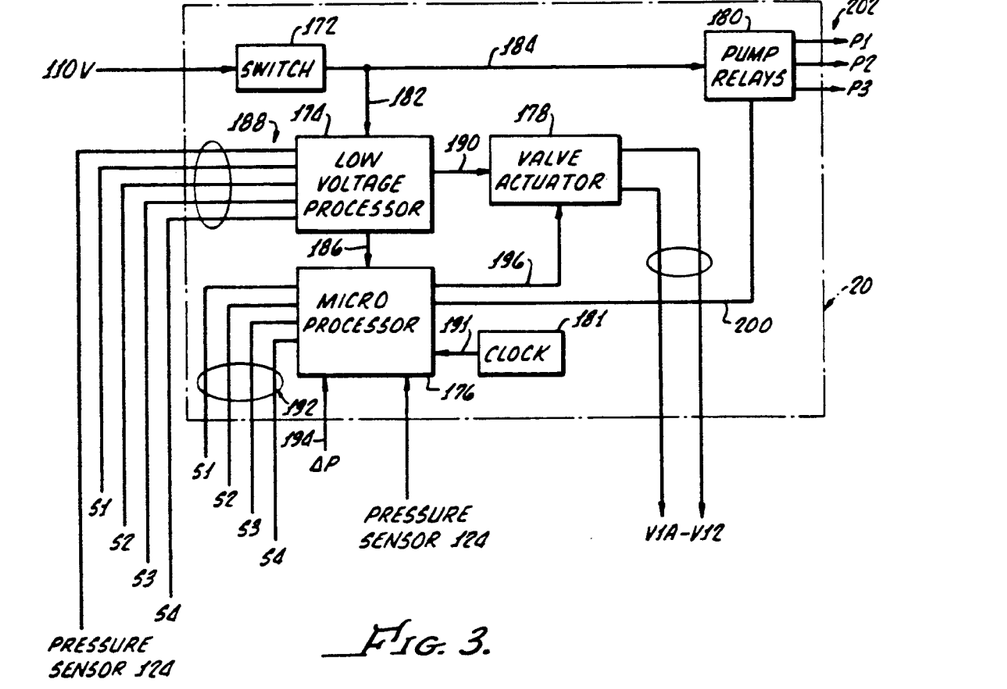
FIG. 3 is a simplified block diagram of the valve and pump control portion of the gray-water reclamation and reuse system of FIG. 1.

As depicted in FIG. 3, control means 20 comprise an actuating switch which is connected to line voltage (for example, 110 volts), a low voltage power supply 174, a microprocessor 176, valve actuating means 178, pump actuating relays 180 and clock 181. As shown, line voltage is provided, downstream of switch 172, to low voltage power supply 174 via a conduit 182. Line voltage is also provided to pump relays 180 via a conduit 184. Low voltage (for example, 12 volts) is provided, over a conduit 186, to microprocessor 176, to sensors S1-S4 over a multi-conduit 188, and to valve actuating means 178 via a conduit 190. Clock 181, provides timing signals to microprocessor 176 via a conduit 191 Microprocessor 176 receives signals from sensors S1-S4 over a multi-conduit 192 and a delta P signal over a conduit 194. Operating control signals are provided from microprocessor 176 to valve actuating means 178 via a conduit 196 and to pump operating relays 180 via a conduit 198. In response to instructions from microprocessor 176, valve actuating means sends valve operating voltage to valves V1A-V12 via a multi-conduit 200 and pump actuating relays send line voltage to pumps P1-P3 over a multi-conduit 202. Basically, in response to electrical signals from sensors S1-S4 and delta P, microprocessor 176 is programmed, in a manner known to those skilled in the microprocessor art, to cause, through valve actuating means 178 and pump relays 180, valves V1A-V12 to open or close in a particular sequence and to cause pumps P1-P3 to operate or stop operating, also in a particular sequence, both depending upon the mode of operation of control means 20.

Gray-water reclamation and reuse system 10 has four modes of operation: "OUT," "START UP," "NORMAL OPERATION," and "BACK FLUSH," all of which are controlled by control means 20. In the OUT mode, system is out of service and waste water from the various sources is drained into drain pipe 52 through valves V1A-V1D, and fresh water is provided to toilet tank 42 and hose bib 44 through valves V10A and V10B. In the START UP mode, waste water from the various sources is directed into sump 12 via valves V2A-V2D, but fresh water is still provided to toilet tank 42 and hose bib 44 through valves V10A and V10B. In the NORMAL OPERATION mode, waste water from the various sources is provided to sump 12 through valves V2A-V2D and filtered waste water from holding tank 16 is pumped to toilet tank and hose bib 44 (on demand) through valves V9A and V9B. In the BACK WASH mode, filtered waste water from tank 16 is pumped in a reverse direction through filter 104 to drain pipe 52 through valves V11 and V12.

The following TABLE shows the condition of valves VIA-V12 and pumps P1-P3 for the above-described four modes of system operation.

TABLE

TABLE
VALVE/PUMP COND. FOR GRAY-WATER SYSTEM

| VALVE/PUMP REF. NO. | TYPE | INOPER-ATIVE | START UP | NORMAL OPERAT | FILTER BACK WASH |
|---|---|---|---|---|---|
| V1A | N.O. | OPEN | CLOSED | CLOSED | OPEN |
| V1B | N.O. | OPEN | CLOSED | CLOSED | OPEN |
| V1C | N.O. | OPEN | CLOSED | CLOSED | OPEN |
| V1D | N.O. | OPEN | CLOSED | CLOSED | OPEN |
| V2A | N.C. | CLOSED | OPEN | OPEN | CLOSED |
| V2B | N.C. | CLOSED | OPEN | OPEN | CLOSED |
| V2C | N.C. | CLOSED | OPEN | OPEN | CLOSED |
| V2D | N.C. | CLOSED | OPEN | OPEN | CLOSED |
| V3 | N.C. | CLOSED | OPEN | OPEN | CLOSED |
| V4 | N.O. | OPEN | OPEN | OPEN | CLOSED |
| V5 | N.O. | OPEN | OPEN | OPEN | CLOSED |
| V6 | N.C. | CLOSED | INTERMIT. | INTERMIT. | CLOSED |
| V7 | N.C. | CLOSED | CLOSED | CLOSED | CLOSED |
| V8 | N.C. | CLOSED | CLOSED | INTERMIT. | CLOSED |
| V9A | N.C. | CLOSED | CLOSED | OPEN | CLOSED |
| V9B | N.C. | CLOSED | CLOSED | OPEN | CLOSED |
| V10A | N.O. | OPEN | OPEN | CLOSED | OPEN |
| V10B | N.O. | OPEN | OPEN | CLOSED | OPEN |
| V11 | N.C. | CLOSED | CLOSED | CLOSED | OPEN |
| V12 | N.C. | CLOSED | CLOSED | CLOSED | OPEN |
| P1 |  | OFF | INTERMIT. | INTERMIT. | OFF |
| P2 |  | OFF | OFF | INTERMIT. | ON |
| P3 |  | OFF | INTERMIT. | INTERMIT. | OFF |

Operation

Figure 4:
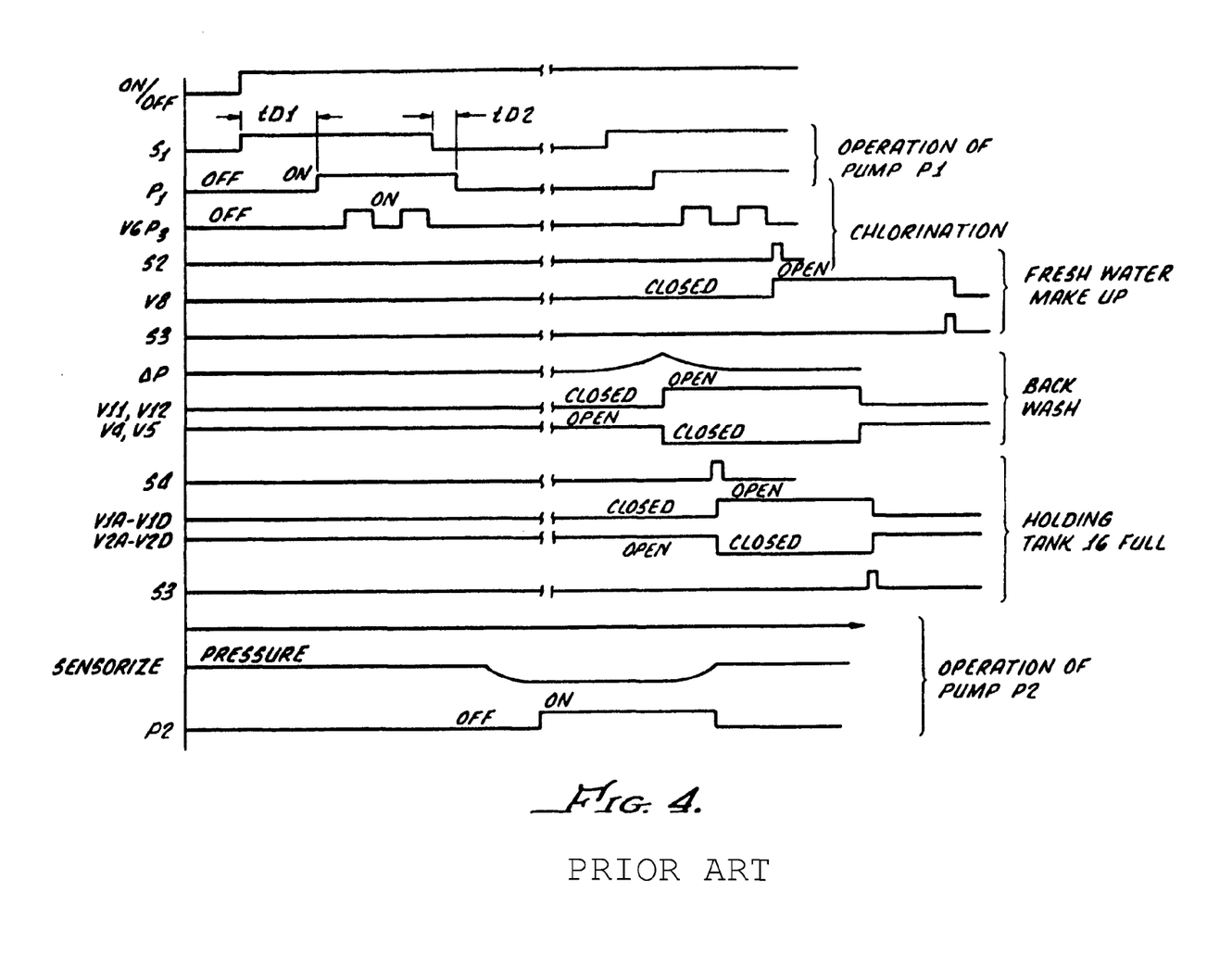
FIG. 4 is timing diagram showing the operational timing of various ones of the valves and pumps of the gray-water reclamation and reuse system of FIG. 1.

FIG. 4 depicts various sequencing operations of system 10 as controlled by microprocessor 176 of control means 20 during the NORMAL OPERATION and BACK WASH modes of operation. For example, during the NORMAL OPERATION mode, it is preferred that first pump PI, which pumps waste water from sump 12 into and through filter 104 is turned on after a preestablished turn-on time delay, $t_{Don}$, which may, for typical systems 10, be about three minutes, after the water level in the sump reaches the level of sensor S1; during this delay time, waste water ordinarily keeps flowing into the sump. Pump PI is kept turned on (by control means 20) until the water level in sump 12 is pumped down to the level of sensor S1 and the signal from S1 ceases. A preestablished turn-off time delay, $t_{Doff}$, which may be about 20 seconds, control means 20 causes pump PI to turn off; during this turn-off delay, water is pumped from the sump so that the water level is below sensor S1. Pump P1 stays turned off until is turned back on in response to the water level in sump 12 again reaching the level of sensor S1 and the pumping cycle is repeated. Of course, different pumping schedules of pump P1 could alternatively be provided by control means 20.

It is further advantageous to control the chlorination of filtered waste water in holding tank 16 by means 18 in accordance to the amount of waste water pumped into the tank by pump P1. To this end, and as depicted in FIG. 4, valve V6 may be opened and closed and pump P3 may be cycled on and off (in concert with the valve being opened and closed) for predetermined lengths of time and at predetermined intervals while pump P1 remains turned on and is thereby pumping waste water from sump 12 through filter 104 into holding tank 16. Such cyclic operation of valve V6 and pump P3 is at a rate calculated to provide the requisite chlorination of the filtered waste water in holding tank 16. For example, pump P3 may be cycled on for about two seconds about every three-four minutes of operation of pump P1 to provide the results indicated in the Example below.

Make-up fresh water may be automatically added to holding tank, by the opening of valve V8, when the water level in the tank reaches a predetermined minimum level indicated by a signal from sensor S2. Valve V8 may be left open until the water level in tank 16 reaches an intermediated level indicated by sensor S3, at which point the valve is closed and the addition of make-up water ceases.

The BACK WASH mode of operation is entered, as depicted in FIG. 4, when the delta P across filter 104 reaches a predetermined level (for example, about 9 psi) indicating that waste materials are reducing the efficiency of the filter. At that point, valves V4 and V5 are closed and back flush valves V11 and V12 are opened. Control means 20 is preferably configured (that is, microprocessor 176 is preferably programmed) so that the BACK WASH mode is not entered when pump PI is operating. Other valves and pumps in system 10 are operated as shown in the foregoing TABLE for the BACK WASH mode of operation.

Since filtered and treated water from holding tank 16 is ordinarily needs to be supplied under pressure by pump P2 to the sources of reuse, microprocessor 176 is programmed to turn on pump P2 whenever pressure sensor 122 in conduit 112 senses a pressure drop below a pre-established level, for example, when water is flushed form toilet tank 42 or is discharged from hose bib 44. When normal operating pressure is reestablished in conduit 12, for example, when toilet flushing is completer or water is no longer drawn from hose bib 44, pump P2 is automatically turned off. Note that holding tank 16 is not required to be pressurized and normally is at ambient pressure.

In the event that the level of filtered waste water in holding tank 16 reaches a maximum level indicated by a signal from sensor S4, it is desirable to stop receiving waste water from the various sources, and valves V2A-V2D are closed and valves V1A-V1D are opened so that the sources drain into drain pipe 52. This condition continues until the water level in tank 16 has been drawn down to an intermediate level signaled by sensor S3, at which time valves V1A-V1D are closed and valves V2A-V2D are opened to resume the NORMAL OPERATION mode.

EXAMPLE

By way of specific example, again with no limitation being thereby intended or implied, sump 12 may have a capacity of between about 30-70 gallons, depending upon the number of waste water sources feeding into the sump and the daily amount of waste water usually produced. For example, for a large house having a number of occupants a larger-capacity sump 12 would ordinarily be used that for a smaller home with only one or two occupants. Filter 104 is preferably constructed to reduce the level of surfactants in the waste water from a normal level of about 29 Mg./liter to only about 0.04 Mg./liter, and is advantageously of a multimedia type employing gravel and carbon. Its size may, for example, be about 10 inches in diameter and about 54 inches high, but may be larger for more extensive installations. For such a filter, a back wash time of about 10 minutes, using about 50 gallons of water from tank 16 would normally be required. Typically filter 104 can be back washed a number of times and its contents would need changing (or a new filter installed about every 9-12 months. Two or more filters 104 may be connected in parallel in order to increase filtering capacity.

Holding tank 16 may have a capacity of between about 250 gallons and 1000 gallons, depending on individual household waste water production and reuse rates. For holding about 250 gallons, tank 16 may be about 42 inches in diameter and about 48 inched high.

First pump P1 may have an output of about 3-8 gallons per minute at a pressure of between about 19-25 psi and second pump P2 which may have a capacity of about 10-15 gallons per minute at a pressure of between about 25-30 psi. While these pump capacities and pressures are preferred for typical installations of system 10, it will be understood that pumps PI and/or P2 having different capacities and pressures can alternatively be used where needed or desired.

Ideally, the amount of chlorine provided to holding tank 16 by chlorinating means 18 reduces the colaform level in the filtered waste water from filter 104 from a normal level of about 2400 mpn to only about 1.5 mpn. To achieve this result, is has been found by the present inventor that about 2 teaspoons of chlorine is usually required for each 200 gallons of waste water entering holding tank 16 from filter 104. This amount of chlorine may, of course, vary according to the condition of the waste water from filter 104 and colaform level measurements are ordinarily required to determine the amount of chlorination required. As mentioned above, pump PI is running, pump P3 may be cycled on for about 2 seconds every 3-4 minutes.

Figure 5:
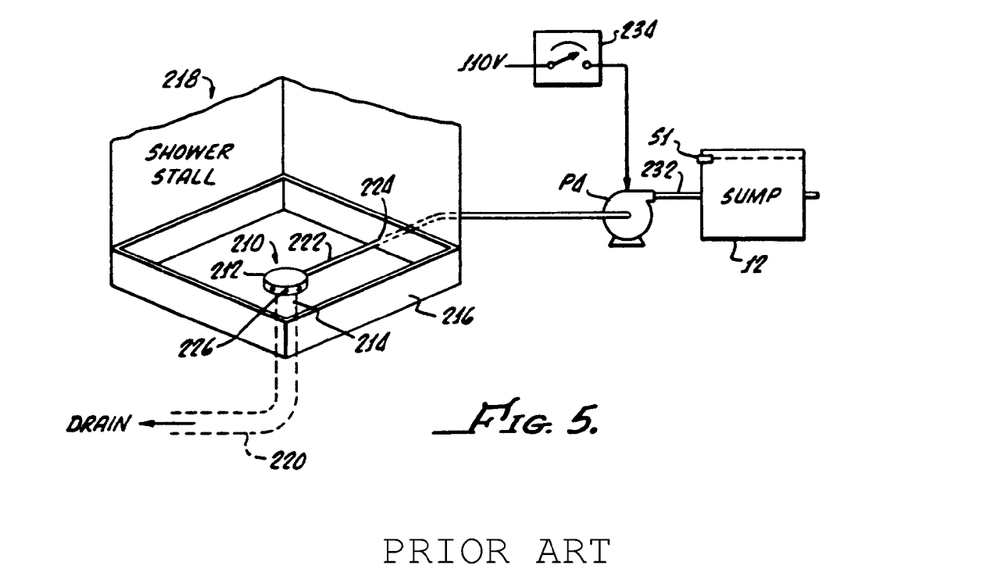
FIG. 5 is a perspective drawing showing a variation means for the providing for gray-water from an exemplary, concrete slab-mounted shower stall to the sump shown in FIG. 1 by means of a drain-plug adaptor, this variation being particularly applicable for preexisting shower stalls (or the like) installed on a concrete slab floor. In the various FIGS. like elements and features are given the same reference number and/or other identification.

Variation of FIG. 5

The foregoing description of gray-water reclamation and reuse system 10 has assumed gravity flow of waste water into sump 12 from sources 30-36, as would be the case for the installation of system in a home or the like built on a foundation such that various pipping and valves can be installed under the house. Such a gravity-flow system 10 can also usually be made if the system is installed when a slab-floor home is under construction. In such case suitable plumbing modifications from normal plumbing installations can be made.

However, there are many instances when it is desirable to utilize system 10, and achieve at least many or most of its benefits, on preexisting, slab-floor homes. In such case, the above-described connections to sinks and washers may be possible, but will generally not be possible for first-floor shower stalls and bathtubs which rest on the slab. In such case, certain modifications are made upstream of sump 12, but downstream of sump 12 the system remains as above described.

As shown in FIG. 5, there is provided a suction means 210 which comprises a replacement drain stopper 212 which fits into a preexisting drain opening 214 (after the existing drain screen has been removed) in a pan portion 216 of a conventional shower stall 216, only lower regions of which are shown. With replacement drain stopper 212 so installed, shower water is prevented from running out of shower pan 216 down an associated drain pipe 220. Connected to drain stopper 212 is a flexible hose or conduit 222 which exits shower pan 216 through a side aperture 224 which is sealed around the hose. One or more water intake apertures 226 through drain stopper 212 communicate through the stopper with an inlet end of hose 222. Outside of shower stall 218 hose 222 connects to a small suction pump P4, the output of which is connected by a hose or conduit 232 to an inlet of sump 12. Preferably, suction pump P4 is controlled through a timer switch 234. When a shower is started in shower stall 218, and with drain stopper 212 in place, switch 234 is turned on and set for the estimated duration of the shower. Suction pump P4 then sucks waste water from shower pan 216 through stopper 212 and hose 22 and discharges the water through hose 232 into sump 12. Waste-water is pumped from sump 12 in the manner described above.

It can be appreciated that an arrangement similar to that just described can be used in conjunction with a bathtub to remove bath water therefrom.

The control of suction pump can be effected in ways other than through timer switch. For example, for use with shower stall 218, a small flowmeter (not shown) can be installed in the shower pipe upstream of the shower nozzle and connected to control means 20 such that a flow of water through the flowmeter causes suction pump P4 to be actuated. When the flowmeter indicates that the flow of shower water has stopped, pump P4 can be turned off after a delay sufficient to permit complete draining of shower pan 110.

Figure 6A:
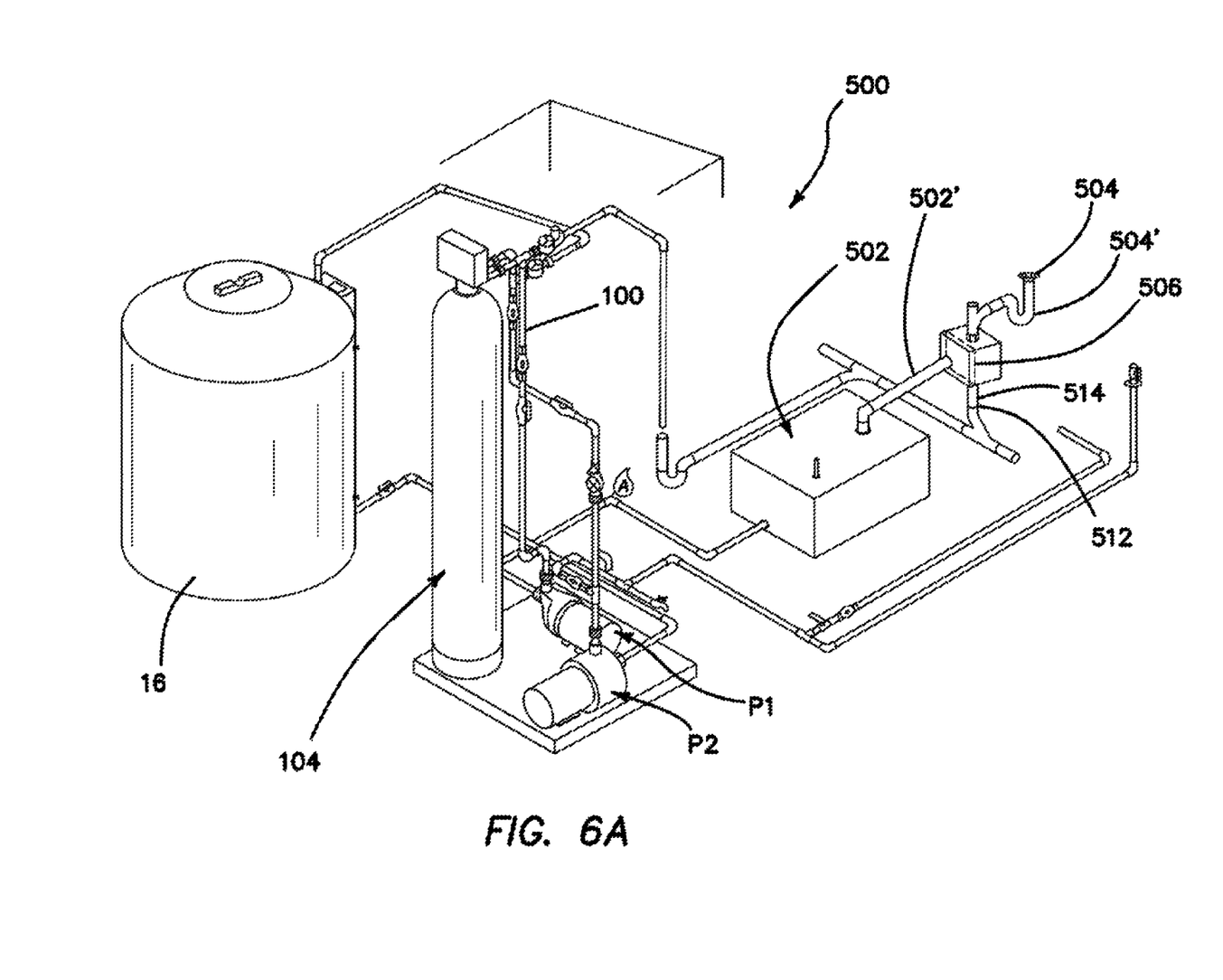
FIG. 6A is a perspective view of an alternative embodiment of the gray water reclamation and reuse system comprising a filter-valve disposed upstream of the gray water tank.
Figure 6B:
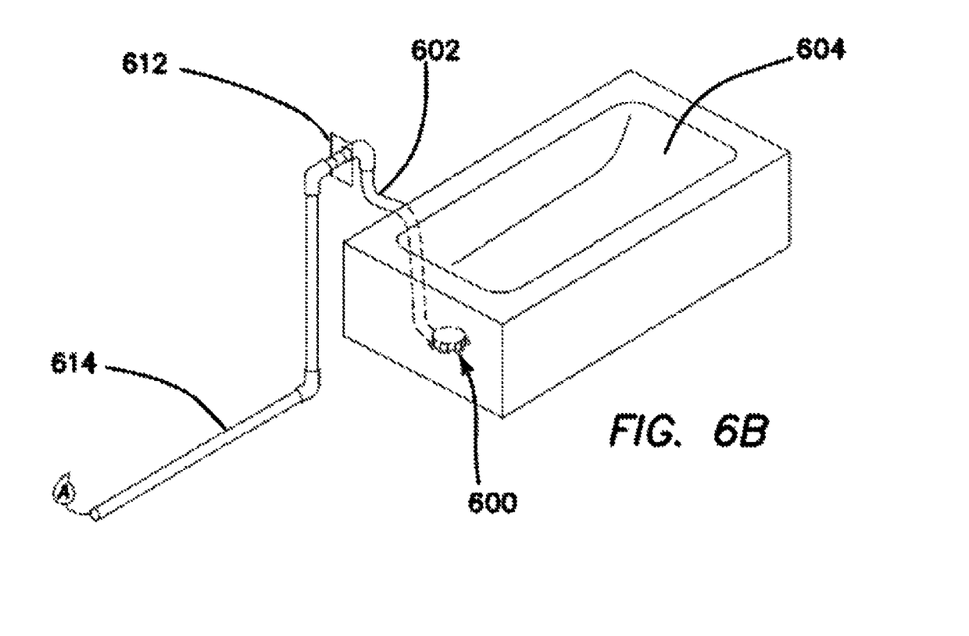
FIG. 6B is a magnified side cross sectional view of the filter-valve component used in the gray water reclamation and reuse system seen in FIG. 6A.
Figure 6C:
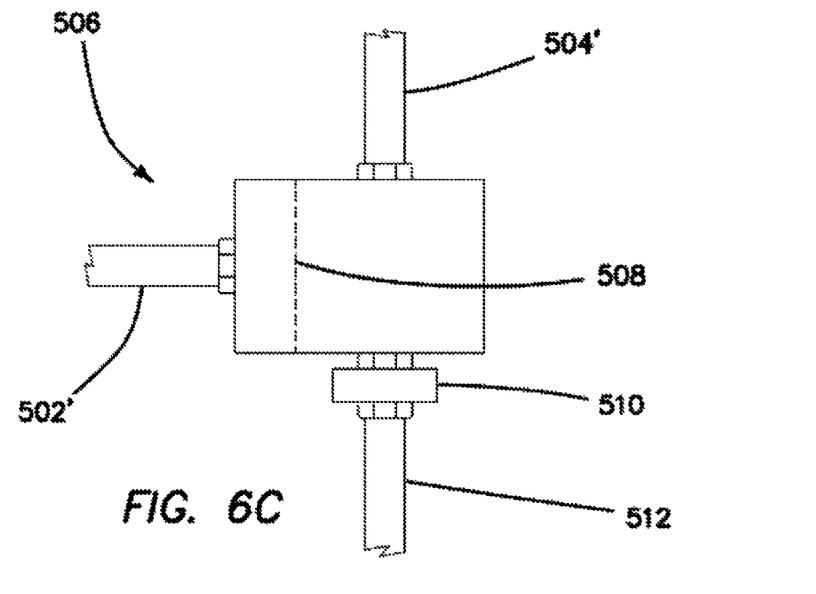
FIG. 6C is a perspective view of a plug suction device disposed in a tub and coupled to a gray water conduit of the gray water reclamation and reuse system seen in FIG. 6A.
Figure 7A:
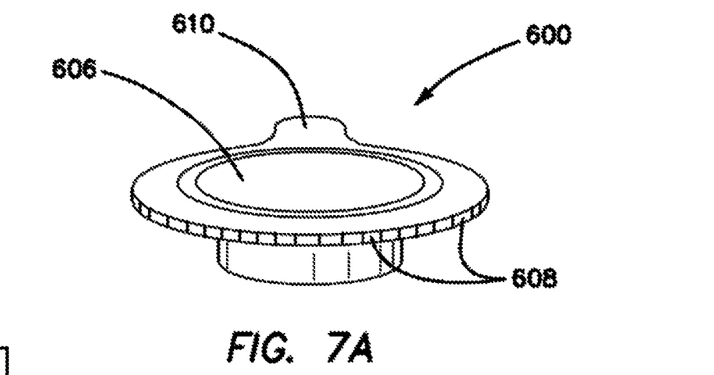
FIG. 7A is a frontal perspective view of a drain suction unit which may be coupled to the gray water reclamation and reuse system seen in FIGS. 6A-6C.
Figure 7B:
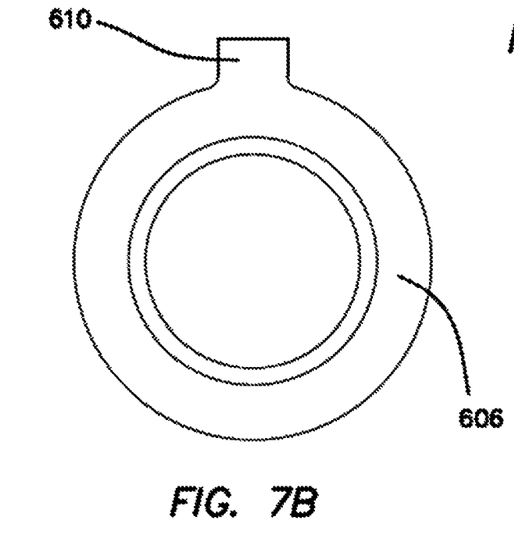
FIG. 7B is a top down perspective view of the drain suction unit seen in FIG. 7A.
Figure 7C:
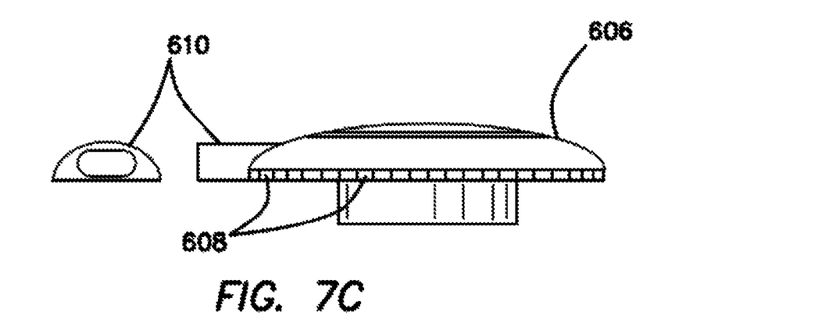
FIG. 7C is an end view and a side perspective view of an alternative embodiment of the drain suction unit seen in FIG. 7A.

Variation of FIGS. 6 and 7

Turning to FIGS. 6 and 7, an alternate embodiment of the reclamation and reuse system may be seen where revisions have been made to expand the use of the water reclamation and reuse system to small commercial and residential systems. In addition, the water reclamation system can be adapted to accept water from all sources within a residential or commercial system with the exception of toilets and garbage disposals.

As seen in FIG. 6A, an alternative gray water reclamation system 500 is seen. Coupled to a gray water conduit 504' between a drain 504 where gray water enters the system 500 and a gray water tank and/or sump 502 is a filter-valve 506. Specifically, the filter-valve 506 is located downstream from a shower drain or other drain outlet 504 and upstream of the gray water tank 502. A plurality of filter-valves 506 may be coupled in parallel in this fashion, specifically with a filter-valve 506 being disposed along each corresponding conduit which couples a gray water source 504 to the reclamation and reuse system 500. Each filter-valve 506 allows for the collection of additional water volume into the reclamation and reuse system over what has been previously possible. The filter-valve 506 may replace or be used in conjunction with the drain valves V1A-V1D seen in FIG. 1.

Each filter-valve 506 collects an additional volume of water which may contain larger particulate matter. Specifically, as seen in FIG. 6B, gray water enters the filter-valve 506 through an outlet conduit 504' which traps large particulate matter by passing the gray water through a filter screen 508 or other means for filtering liquid that is disposed asymmetrically within the filter-valve 506. The filter-valve 506 forces the gray water through the filtering means 508 by maintaining a motor operated valve (MOV) 510 in the closed position when gray water is entering the filter-valve 506 via the outlet conduit 504'. Water which contacts the filter screen 508 is separated into a portion of screened water which passes through the filter screen 508 and a portion of particulate matter which remains behind in the main portion of the filter-valve 506. The portion of screened water continues out of the filter-valve 506 and into the gray water tank 502 via a gray water tank conduit 502' and then through the filtering/purification process outlined above. The filter-valve 506 is cleaned or maintained by backwashing the collected contaminates and particulate matter through the normal sewer drain system by opening the installed MOV 510 and allowing the collected particulate matter and backwash to pass there through via the waste conduit 512. The backwash and particulate matter from the filter-valve 506 is then directed into a second waste conduit 514 which is coupled to a pre-existing drainage or sewage system, thus removing the particulate matter from the reclamation system 500. The backwashing process can be set to meet the demands of the particular application for which the reclamation system 500 is installed. Specifically, the owner/operator of the reclamation system 500 can set the time, date and frequency of the backwashing via the control means 20 described above. Alternatively, a plurality of MOVs 510 may be coupled to each of the plurality of filter-valves 506 at each individual inlet/outlet 504 to coordinate backwashing and normal operating modes throughout the reclamation system 500 contemporaneously.

In situations where water from the gray water source cannot be gravity fed into the gray water tank 502, a removable drain suction unit 600 as seen in FIGS. 6C and 7A-7C may be used. The drain unit 600 is connected to a flexible hose conduit 602 at its distal end while the unit 600 itself is placed directly over a pre-existing drain plug of a gray water source such as a shower or bath tub 604. The drain unit 600 comprises a top surface 606 which may be substantially flat as seen in FIG. 7A, or in an alternative embodiment seen in FIG. 7C, may comprise a substantially rounded or elliptical shape. Around the circumference of the substantially circular top surface 606 is a plurality of inlets or apertures 608. The drain unit 600 also comprises a hollow hose aperture 610 which is fluidly coupled or connected with the plurality of inlets 608. The hose aperture 610 is sufficiently sized and shaped to accommodate the hose conduit 602. The hose conduit 602 is in turn connected to a slab conduit 614 through an a fixture 612 disposed adjacently to the gray water source such as the bath tub 604 seen in FIG. 6C. The slab conduit 614 is then coupled to the line leading from the gray water tank 502 to the first pump P1 at Point A as seen in FIG. 6A, thus ensuring that the gray water from the bath tub 604 or other gray water source is fed directly into the filter 104 without first passing through the gravity-fed portion of the reclamation and reuse system 500, namely the filter-valve 506 and gray water tank 502. When the first pump P1 is activated, gray water is drawn from the bath tub 604 (or other gray water source) through the plurality of inlets 608 of the drain unit 600. The gray water is then directed out of the drain unit 600 through the hose aperture 610 and into the hose conduit 602. After passing through the fixture 612, the gray water is incorporated into the reclamation and reuse system 500 as detailed above, specifically the gray water is fed into the line disposed between the gray water tank 502 and the first pump P1 at Point A marked in FIG. 6A. By simply placing the drain unit 600 over a pre-existing drain of a bath tub 604 or other gray water source, gray water is prevented from entering the normal waste drain thus many already existing residential or commercial gray water sources may be easily and inexpensively retrofitted for use in the disclosed water reclamation and reuse system.

The filter-valve 506 and drain unit 600 allow for additional water collection which will allow for gray water to be reclaimed for use in toilets, and additionally, for use in landscaping or yard use so that property values can be maintained. With these modifications, the total savings in fresh water consumption in residential or commercial applications could increase to over 60%.

Many alterations and modifications may be made by those having ordinary skill in the art without departing from the spirit and scope of the embodiments. Therefore, it must be understood that the illustrated embodiment has been set forth only for the purposes of example and that it should not be taken as limiting the embodiments as defined by the following embodiments and its various embodiments.

Therefore, it must be understood that the illustrated embodiment has been set forth only for the purposes of example and that it should not be taken as limiting the embodiments as defined by the following claims. For example, notwithstanding the fact that the elements of a claim are set forth below in a certain combination, it must be expressly understood that the embodiments includes other combinations of fewer, more or different elements, which are disclosed in above even when not initially claimed in such combinations. A teaching that two elements are combined in a claimed combination is further to be understood as also allowing for a claimed combination in which the two elements are not combined with each other, but may be used alone or combined in other combinations. The excision of any disclosed element of the embodiments is explicitly contemplated as within the scope of the embodiments.

The words used in this specification to describe the various embodiments are to be understood not only in the sense of their commonly defined meanings, but to include by special definition in this specification structure, material or acts beyond the scope of the commonly defined meanings. Thus if an element can be understood in the context of this specification as including more than one meaning, then its use in a claim must be understood as being generic to all possible meanings supported by the specification and by the word itself.

The definitions of the words or elements of the following claims are, therefore, defined in this specification to include not only the combination of elements which are literally set forth, but all equivalent structure, material or acts for performing substantially the same function in substantially the same way to obtain substantially the same result. In this sense it is therefore contemplated that an equivalent substitution of two or more elements may be made for any one of the elements in the claims below or that a single element may be substituted for two or more elements in a claim. Although elements may be described above as acting in certain combinations and even initially claimed as such, it is to be expressly understood that one or more elements from a claimed combination can in some cases be excised from the combination and that the claimed combination may be directed to a subcombination or variation of a subcombination.

Insubstantial changes from the claimed subject matter as viewed by a person with ordinary skill in the art, now known or later devised, are expressly contemplated as being equivalently within the scope of the claims. Therefore, obvious substitutions now or later known to one with ordinary skill in the art are defined to be within the scope of the defined elements.

The claims are thus to be understood to include what is specifically illustrated and described above, what is conceptionally equivalent, what can be obviously substituted and also what essentially incorporates the essential idea of the embodiments.

I claim:

1. A gray-water reclamation and reuse system for collecting, filtering and storing for use waste water, said system comprising:
 a gray water tank for collecting waste water;
 a filter-valve disposed between the gray water tank and a gray water source, wherein the filter-valve comprises a filter screen;
 a holding tank disposed downstream of the gray water tank;
 a filter disposed between the gray water tank and the holding tank;
 a first pump disposed between the gray water tank and the filter, wherein the first pump is configured to pump gray water from the gray water tank, through the filter, and into the holding tank;
 a second pump disposed between the holding tank and an outlet, wherein the second pump is configured to pump filtered gray water from the holding tank to the outlet; and
 a control means configured to control the operation of the first and second pumps, the filter, and the filter-valve.

2. The system of claim 1 wherein the filter screen is asymmetrically disposed within an internal volume of the filter-valve.

3. The system of claim 1 wherein the filter-valve is coupled to an outlet conduit connected to the gray water source, a gray water tank conduit connected to the gray water tank, and a waste conduit connected to the filter.

4. The system of claim 3 wherein the filter-valve comprises a filter screen disposed only over the gray water tank conduit coupled to the filter-valve.

5. The system of claim 1 wherein the filter-valve comprises a motor operated valve controlling the access to at least one of a plurality of conduits coupled to the filter-valve.

6. The system of claim 5 wherein the motor operated valve is disposed on a waste conduit coupled to the filter-valve.

7. The system of claim 1 further comprising a drain suction unit disposed inside of a gray water source, wherein the drain suction unit is indirectly coupled to the system downstream of the gray water tank.

8. The system of claim 7 wherein the drain suction unit comprises a plurality of inlets and a hose aperture.

9. The system of claim 7 wherein the first pump is configured to draw in gray water through the drain suction unit.

10. A gray-water reclamation and reuse system for collecting, filtering and storing for use waste water, said system comprising:
 a gray water tank for collecting waste water;
 a plurality of filter-valves disposed between the gray water tank and a corresponding plurality of gray water sources, wherein each of the plurality of filter-valves comprise a filter screen;
 a holding tank disposed downstream of the gray water tank;
 a filter disposed between the gray water tank and the holding tank;
 a first pump disposed between the gray water tank and the filter, wherein the first pump is configured to pump gray water from the gray water tank, through the filter, and into the holding tank;
 a second pump disposed between the holding tank and an outlet, wherein the second pump is configured to pump filtered gray water from the holding tank to the outlet; and
 a control means configured to control the operation of the first and second pumps, the filter, and the plurality of filter-valves.

11. The system of claim 10 wherein each of the plurality of filter-valves are coupled to an outlet conduit connected to its corresponding gray water source, a gray water tank conduit connected to the gray water tank, and a waste conduit connected to the filter.

12. The system of claim 11 wherein the filter screen within each of the plurality of filter-valves is disposed only over the gray water tank conduit coupled to each filter-valve.

13. The system of claim 11 wherein each of the plurality of filter-valves comprise a motor operated valve disposed on the waste conduit coupled to each of the plurality of filter-valves.

14. The system of claim 10 further comprising a plurality of drain suction units disposed inside of a corresponding plurality of gray water sources, wherein each of the plurality of drain suction units are indirectly coupled to the system downstream of the gray water tank.

* * * * *